United States Patent
Oh et al.

(10) Patent No.: US 8,792,060 B2
(45) Date of Patent: Jul. 29, 2014

(54) LIQUID CRYSTAL DISPLAY DEVICE AND METHOD FOR MANUFACTURING THE SAME

(75) Inventors: Kum Mi Oh, Seoul (KR); Jae Hoon Park, Paju-si (KR); Han Seok Lee, Seoul (KR); Hee Sun Shin, Paju-si (KR); Won Keun Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 5 days.

(21) Appl. No.: 13/198,175

(22) Filed: Aug. 4, 2011

(65) Prior Publication Data

US 2012/0068200 A1    Mar. 22, 2012

(30) Foreign Application Priority Data

Sep. 20, 2010    (KR) .................. 10-2010-0092392

(51) Int. Cl.
*H01L 33/08*    (2010.01)

(52) U.S. Cl.
USPC .............. 349/12; 349/122; 349/96; 345/55; 345/90; 345/173; 345/174; 345/214; 445/24; 257/E21.419; 257/E27.111; 257/E33.053; 257/E29.151; 257/E23.122; 257/59; 257/88; 257/52; 257/299; 438/34

(58) Field of Classification Search
CPC .... G06F 3/0412; G06F 3/041; G02F 1/13338
USPC ........ 445/24; 345/55, 198, 173, 174, 214, 90; 349/122, 12; 257/299.63
See application file for complete search history.

(56) References Cited

U.S. PATENT DOCUMENTS

2010/0194697 A1    8/2010    Hotelling et al.
2011/0291977 A1    12/2011    Moriwaki

FOREIGN PATENT DOCUMENTS

EP             2214084 A       8/2010
WO       2010/084642 A       7/2010

OTHER PUBLICATIONS

EP Search Report dated Dec. 13, 2011, related to corresponding European patent application citing listed patent documents.

*Primary Examiner* — Jerome Jackson, Jr.
*Assistant Examiner* — Bo Fan
(74) *Attorney, Agent, or Firm* — Morgan, Lewis & Bockius LLP

(57) ABSTRACT

A liquid crystal display device with a built-in touch screen, which uses a common electrode as a touch-sensing electrode including an intersection of a gate line and a data line to define a pixel region, a bridge line disposed in a central portion of the pixel, an insulating layer formed on the bridge line, a first contact hole disposed through the insulating layer to expose a predetermined portion of an upper surface of the bridge line, a contact metal on the insulating layer and inside the first contact hole, the contact metal electrically connected with the bridge line, a first passivation layer on the contact metal, a second contact hole disposed through the first passivation layer to expose a predetermined portion of an upper surface of the contact metal, a common electrode on the first passivation layer and inside the second contact hole, a conductive line electrically connected with the common electrode, and a second passivation layer on the first passivation layer and the conductive line, wherein the bridge line and the common electrode are electrically connected via the contact metal.

10 Claims, 5 Drawing Sheets

LIQUID CRYSTAL DISPLAY DEVICE AND METHOD FOR MANUFACTURING THE SAME

CROSS REFERENCE TO RELATED APPLICATIONS

This application claims the benefit of the Korean Patent Application No. 10-2010-0092392 filed on Sep. 20, 2010, which is hereby incorporated by reference as if fully set forth herein.

BACKGROUND OF THE INVENTION

1. Field of the Invention

The present invention relates to a flat panel display device, and more particularly, a liquid crystal display device with a built-in touch screen, which facilitates to improve display quality and to reduce a manufacturing cost by a simplified manufacturing process, and a method for manufacturing the same.

2. Discussion of the Related Art

With the developments in various mobile electronic equipment, such as mobile terminals and notebook computers, there is the increasing demand for an applicable flat panel display device.

The flat panel display device may include a liquid crystal display device (LCD), a plasma display panel (PDP), a field emission display device (FED), a light-emitting diode display device (LED), etc.

Among the various flat panel display devices, the LCD device is widely used owing to various advantages. For example, technical developments have been made for the mass production of LCD devices, the driving means is easy, power consumption is low, and the LCD devices have high-quality resolution and large-sized screens.

Instead of using a related art mouse or keyboard as an input device of the flat panel display device, a touch screen is used as a new input device for the flat panel display device, wherein the touch screen enables a user to directly input information by the use of finger or pen.

The touch screen has been widely applied in various fields, for example, mobile terminals such as navigation, terminal for industrial use, notebook computer, automatic teller machine (ATM), mobile phone, MP3, PDA, PMP, PSP, mobile game machine, DMB receiver, and tablet PC; and electric appliances such as refrigerator, microwave oven, and washing machine. Furthermore, the easy operation of the touch screen rapidly enlarges the application field.

On application of touch screen to the LCD device, an LCD device with a built-in touch screen has been researched and developed to achieve a slim device.

FIG. 1 illustrates an LCD device with a built-in touch screen according to the related art, and a method for driving the same.

Referring to FIG. 1, the LCD device with a built-in touch screen according to the related art comprises lower and upper substrates 50 and 60 bonded to each other with a liquid crystal layer (not shown) interposed therebetween.

On the upper substrate 60, there are a black matrix 62; red, green, and blue color filters 64R, 64G, and 64B; and an overcoat layer 66. In this case, the black matrix 62 defines a pixel region corresponding to each of plural pixels. Also, the red, green, and blue color filters 64R, 64G, and 64B are respectively formed in the respective pixel regions defined by the black matrix 62. The overcoat layer 66 covers the red, green, and blue color filters 64R, 64G, and 64B and the black matrix 62, to thereby planarize the upper substrate 60.

On the lower substrate 50, there is a pixel array 40 including plural pixels to drive the liquid crystal layer and detect a touching point by finger or pen.

Each of the plural pixels is defined by gate and data lines crossing each other. At the crossing portion of the gate and data lines, there is a thin film transistor (hereinafter, referred to as 'TFT'). Each of the plural pixels includes a common electrode and a pixel electrode.

Recently, an in-cell touch type LCD device has been researched and developed, wherein the in-cell touch type LCD device refers to an LCD device that uses an element existing in the related art structure as a touch-sensing electrode (for example, a common electrode Vcom may be used as a touch-sensing electrode).

FIG. 2 is a cross section view illustrating a lower substrate in the LCD device with a built-in touch screen according to the related art. FIG. 2 shows a common electrode formed in the X-axis direction among all common electrodes of the LCD device.

In the LCD device with a built-in touch screen according to the related art, as shown in FIG. 2, a common electrode 75 of a lower substrate 50 not only supplies a common voltage (Vcom), but also functions as a sensing electrode for detection a user's touch.

For detection of the user's touch, the common electrodes (sensing electrode) 75 are formed in the X-axis and Y-axis directions. The common electrode 75 in the X-axis direction is brought into contact with a gate metal 73 at a lower portion of the lower substrate 50 through a contact structure, to be described.

In more detail, each pixel of the lower substrate 50 includes a buffer layer 51 on a glass substrate; a gate insulating layer 52; the gate metal 73; an interlayer dielectric (ILD) 53; a contact metal 74; a first passivation layer (PAS0) 54; a second passivation layer (PAS1) 55; the common electrode (Vcom) 75; a conductive line ($3^{rd}$ metal) 76; a third passivation layer (PAS2) 56; and a contact electrode 77.

The first to third passivation layers (PAS0 to PAS2) 54 to 56 are partially etched to thereby form a contact hole for exposing a predetermined portion of the contact metal 74.

In addition, the third passivation layer (PAS2) 56 is additionally etched to expose the conductive line 76.

The gate metal 73 is formed of metal used for forming gate line.

The contact metal 74 is formed of metal used for forming source and drain electrodes of TFT.

The contact electrode 77 is formed of a transparent conductive material used for a pixel electrode (for example, ITO). Also, the contact electrode 77 is formed simultaneously with the pixel electrode.

According as the first, second, and third passivation layers 54, 55, and 56 are partially etched, the contact hole for exposing the contact metal 74 is formed in the contact electrode 77. Also, the conductive line 76 is exposed by etching the third passivation layer 56 thereabove.

The contact electrode 77 is formed inside the contact hole and simultaneously on the third passivation layer (PAS2) 56. Thus, the contact electrode 77 is electrically connected with the contact metal 74 and the conductive line 76.

Through the contact structure between the contact electrode 77 and the contact metal 74, among the entire common electrodes driven as the touch-sensing electrode, the common electrode 75 in the X-axis direction is brought into contact with the gate metal 73.

For bringing the common electrode 75 in the X-axis direction into contact with the gate metal 73 in the in-cell touch type LCD device according to the related art, the contact electrode 77 is formed simultaneously with the pixel electrode.

If the common electrode 75 is brought into contact with the gate metal 73 by the use of transparent metal for the pixel electrode, an aperture ratio of the corresponding pixel with the contact structure is relatively lower than that of the other pixels.

In order to connect the common electrodes of the neighboring pixels in the X-axis direction in the related art contact structure, the conductive line 76 is connected with the contact electrode 77, and the contact metal 74 connected with the gate metal 73 is connected with the contact electrode 77. This double contact structure may cause the structural problem of the increased size of the contact portion.

The aperture ratio in the pixel with the contact structure is lowered by the increased size of the contact portion. Especially, in case of the pixel structure with plural domains, the contact structure using the transparent metal of the pixel electrode is used so that an aperture ratio of the corresponding pixel is about 80% as compared to that of the neighboring pixels.

Accordingly, the pixel with the contact structure may be shown as a dark point when a viewer watches the corresponding pixel with the contact structure, to thereby lower visibility. As a result, a picture quality of the LCD device is deteriorated. The double contact structure may cause the complicated manufacturing process and low manufacturing efficiency.

SUMMARY OF THE INVENTION

Accordingly, the present invention is directed to an LCD device and a method for manufacturing the same that substantially obviates one or more problems due to limitations and disadvantages of the related art.

An aspect of the present invention is to provide an LCD device and a method for manufacturing the same, which facilitates to realize high aperture ratio in a pixel with a contact structure between a bridge line and a conductive line for connection of a touch-sensing electrode (common electrode).

Another aspect of the present invention is to provide an LCD device and a method for manufacturing the same, which facilitates to improve manufacturing efficiency owing to a simplified process of a lower substrate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device with a built-in touch screen, which uses a common electrode as a touch-sensing electrode, comprising an intersection of a gate line and a data line to define a pixel region, a bridge line disposed in a central portion of the pixel, an insulating layer formed on the bridge line, a first contact hole disposed through the insulating layer to expose a predetermined portion of an upper surface of the bridge line, a contact metal on the insulating layer and inside the first contact hole, the contact metal electrically connected with the bridge line, a first passivation layer on the contact metal, a second contact hole disposed through the first passivation layer to expose a predetermined portion of an upper surface of the contact metal, a common electrode on the first passivation layer and inside the second contact hole, a conductive line electrically connected with the common electrode, and a second passivation layer on the first passivation layer and the conductive line, wherein the bridge line and the common electrode are electrically connected via the contact metal.

In yet another aspect of the present invention, there is provided a method for manufacturing a liquid crystal display device with a built-in touch screen, which uses a common electrode as a touch-sensing electrode, comprising the steps of forming a pixel region defined by an intersection of a gate line and a data line, forming a bridge line disposed in a central portion of the pixel, forming an insulating layer on the bridge line, a first contact hole disposed through the insulating layer to expose a predetermined portion of an upper surface of the bridge line, forming a contact metal on the insulating layer and inside the first contact hole, the contact metal electrically connected with the bridge line, forming a first passivation layer on the contact metal, a second contact hole disposed through the first passivation layer to expose a predetermined portion of an upper surface of the contact metal, forming a common electrode on the first passivation layer and inside the second contact hole, forming a conductive line electrically connected with the common electrode, and forming a second passivation layer on the first passivation layer and the conductive line, wherein the bridge line and the common electrode are electrically connected via the contact metal.

In yet another aspect of the present invention, there is provided a method for manufacturing an liquid crystal display device with a built-in touch screen comprising forming a first contact hole by etching a predetermined portion of an insulating layer on a bridge line, wherein the first contact hole exposes a predetermined portion of an upper surface of the bridge line, forming a contact metal on the insulating layer and inside the first contact hole, wherein the contact metal is electrically connected with the bridge line, forming a first passivation layer on the contact metal, and forming a second contact hole by etching a predetermined portion of the first passivation layer, wherein the second contact hole exposes a predetermined portion of an upper surface of the contact metal, forming a common electrode on the first passivation layer and inside the second contact hole, forming a conductive line inside the second contact hole, wherein the conductive line is electrically connected with the common electrode, and forming a second passivation layer on the first passivation layer and the conductive line, wherein the bridge line and the common electrode are electrically connected with each other via the contact metal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
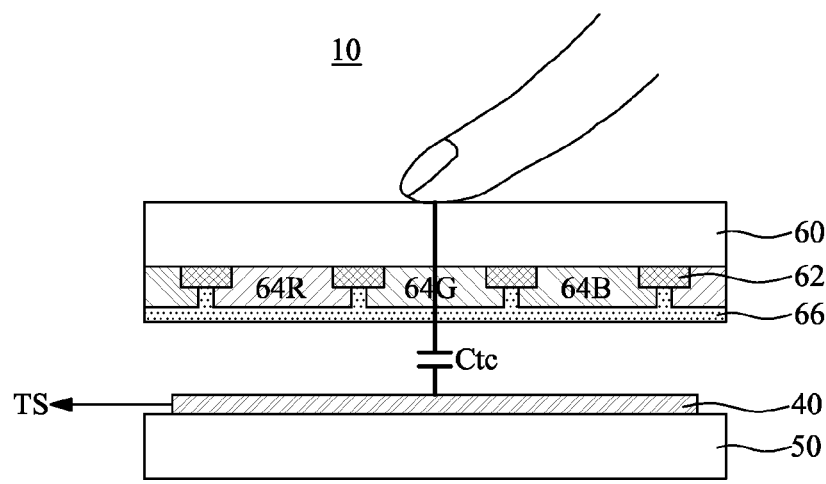
FIG. 1 illustrates an LCD device with a built-in touch screen according to the related art, and a method for manufacturing the same.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device with a built-in touch screen according to the present invention and a method for manufacturing the same will be described with reference to the accompanying drawings.

For the following description of the embodiments of the present invention, if a first structure (for example, electrode, line, layer, contact, and etc.) is described as being formed "on" or "under" a second structure, the first and second structures may come in contact with each other, or there may be a third structure interposed between the first and second structures.

Depending on an alignment mode of liquid crystal layer, an LCD device may be classified into Twisted-Nematic (TN) mode, Vertical-Alignment (VA) mode, In-Plane Switching (IPS) mode, and Fringe Field Switching (FFS) mode.

In case of the IPS mode and the FFS mode, both a pixel electrode and a common electrode are formed in a lower substrate, whereby liquid crystal molecules of the liquid crystal layer are aligned depending on an electric field between the pixel electrode and the common electrode.

Especially, in case of the IPS mode, the pixel electrode and the common electrode are alternately arranged in parallel so that an In-Plane mode electric field occurs between the pixel electrode and the common electrode, thereby aligning the liquid crystal molecules of the liquid crystal layer. However, in case of the IPS mode, the liquid crystal molecules are not properly aligned above the pixel electrode and the common electrode, whereby light transmittance is relatively deteriorated above the pixel electrode and the common electrode.

In order to overcome this problem of the IPS mode, the FFS mode has been proposed. In case of the FFS mode, an insulating layer is interposed between the pixel electrode and the common electrode, whereby the pixel electrode is formed at a predetermined interval from the common electrode by the interposed insulating layer.

In this case, any one of the pixel electrode and the common electrode is formed in a plate shape or pattern, and the other is formed in a finger shape, whereby a fringe field occurs between the pixel electrode and the common electrode. Thus, the liquid crystal molecules of the liquid crystal layer are aligned by the fringe field occurring between the pixel electrode and the common electrode.

The LCD device with a built-in touch screen according to the embodiment of the present invention is formed in the FFS mode.

The LCD device with a built-in touch screen according to the embodiment of the present invention comprises an in-cell touch type liquid crystal panel with a built-in touch screen for detection of a user's touch point; a backlight unit for supplying light to the liquid crystal panel; and a driving circuit.

Herein, a contact structure between a gate metal and a common electrode driven as a touch-sensing electrode is a main point in this present invention. Thus, a detailed explanation for the driving circuit and the backlight unit will be omitted.

For a display period, the LCD device with a built-in touch screen according to the embodiment of the present invention displays an image according to a video signal by controlling transmittance of light passing through a liquid crystal layer in each pixel.

Meanwhile, for a non-display period, the common electrode on the lower substrate is driven as the touch-sensing electrode so as to sense the change of capacitance depending on a user's touch, and to detect the user's touch.

On an upper substrate, there are a black matrix (BM); red, green, and blue color filters; and an overcoat layer.

On a lower substrate, there is a pixel array including plural pixels to drive the liquid crystal layer and detect the touching point by sensing the capacitance depending on the user's touch.

The pixel array includes gate and data lines crossing each other to define the pixel; a common electrode; and a conductive line for connection of the common electrodes of the neighboring pixels. Also, a thin film transistor (TFT) serving as a switching element is formed in each pixel, and is connected with a pixel electrode.

Figure 3:
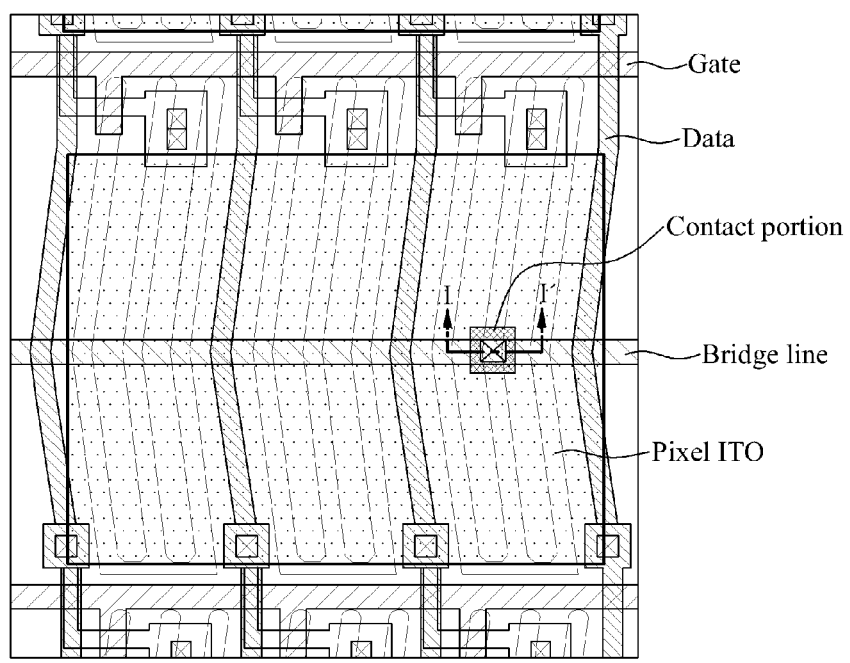
FIGS. 3 and 4 illustrate an LCD device with a built-in touch screen according to the first embodiment of the present invention.
Figure 4:
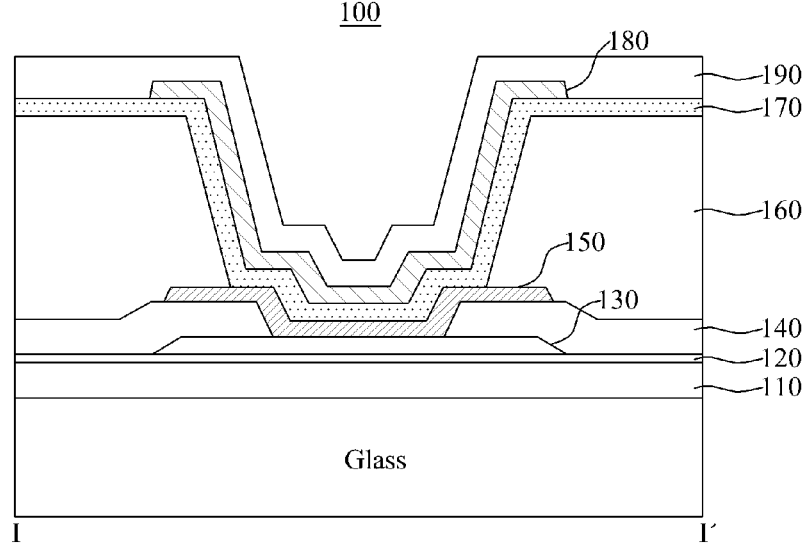

FIGS. 3 and 4 illustrate an LCD device with a built-in touch screen according to the first embodiment of the present invention. FIG. 4 is a cross section view along I-I' of FIG. 3.

FIGS. 3 and 4 show a contact portion between a bridge line and a common electrode in an entire pixel region of a lower substrate.

In the LCD with a built-in touch screen according to the first embodiment of the present invention, the contact structure between the bridge line and the common electrode has an overlap portion, to thereby realize high aperture ratio in the corresponding pixel with the contact structure of common electrode.

Referring to FIGS. 3 and 4, on the lower substrate 100, there are a buffer layer 110; a gate insulating layer (GI) 120; a bridge line 130; an interlayer dielectric (ILD) 140; a contact metal 150; a first passivation layer (PAS1) 160; a common electrode (Vcom) 170; a conductive line 180; and a second passivation layer (PAS2) 190.

The buffer layer 110 and the gate insulating layer 120 are sequentially formed on a glass substrate. Then, the bridge line 130 is formed on the gate insulating layer 120. The bridge line 130 is formed of metal used for forming the gate line, wherein the bridge line 130 is positioned in the central portion of the pixel.

Although not shown, an active layer (semiconductor layer) is formed below the gate insulating layer 120 of a TFT region. Also, a channel of the TFT is formed in an overlap region between the active layer and a gate electrode diverged from the gate line.

Then, TEOS (Tetra Ethyl Ortho Silicate) or MTO (Middle Temperature Oxide) may be deposited to cover the bridge line 130 by CVD (Chemical Vapor Deposition), thereby forming the interlayer dielectric 140.

A predetermined portion of an upper surface of the bridge line 130 is exposed by etching a predetermined portion of the interlayer dielectric 140. Also, predetermined portions of the contact metal 150, positioned on the interlayer dielectric 140, are overlapped with the bridge line 130.

In the exposed portion of the bridge line 130, the contact metal 150 is electrically connected with the bridge line 130.

At this time, the contact metal 150 is brought into contact with the central portion of the bridge line 130. That is, the bridge line 130 is overlapped with the contact metal 150.

The contact metal 150 may be formed of metal used for formation of source and drain electrodes of the TFT. Also, the contact metal 150 may be formed simultaneously with the source and drain electrodes of the TFT.

The first passivation layer (PAS1) 160 is formed on the interlayer dielectric 140 and the contact metal 150. A predetermined portion of an upper surface of the contact metal 150 is exposed by partially etching the first passivation layer (PAS1) 160 above the contact portion between the bridge line 130 and the contact metal 150.

The common electrode 170 is formed of a transparent conductive material such as ITO. The common electrode 170 is formed on the first passivation layer (PAS1) 160, and simultaneously formed inside the contact hole obtained by partially etching the first passivation layer (PAS1) 160. Inside the contact hole, the contact metal 150 is electrically connected with the common electrode 170.

For a display period of one frame or plural frames, the common electrode 170 supplies the common voltage for controlling the transmittance of light passing through the liquid crystal layer to the pixel.

For a non-display period of one frame or plural frames, the common electrode 170 is driven as the touch-sensing electrode to detect the change of capacitance (Ctc) depending on the user's touch.

Generally, the common electrode of the LCD device according to the related art is formed in a plate shape to supply the same common voltage (Vcom) to the entire pixel region of the lower substrate.

The common electrode 170 of the LCD device according to the first embodiment of the present invention not only supplies the common voltage (Vcom), but also functions as the touch-sensing electrode for detection the user's touch.

Accordingly, the common electrode 170 is patterned every individual pixel. The common electrode 170 may be patterned every predetermined number of the pixels.

The common electrodes of the neighboring pixels may be connected via the conductive line 180 by the X-axis direction or Y-axis direction. At this time, the common electrodes of the X-axis direction are brought into contact with the bridge line 130 through the aforementioned contact structure.

The conductive line 180 is formed by depositing (burying) a metal material on the first passivation layer (PAS1) 160 and inside the contact hole obtained by etching the first passivation layer (PAS1) 160. The conductive line 180 is brought into contact with the common electrode 170.

At this time, the conductive line 180 may be formed as the contact line to make the common electrode 170 driven as the touch-sensing electrode for detection of the user's touch.

The second passivation layer (PAS2) 190 is formed to cover the common electrode 170 and the conductive line 180.

The above LCD device with a built-in touch screen according to the first embodiment of the present invention has the contact structure where the bridge line 130, the contact metal 150, the common electrode 170, and the conductive line 180 are overlapped with one another in the same vertical line.

Figure 2:
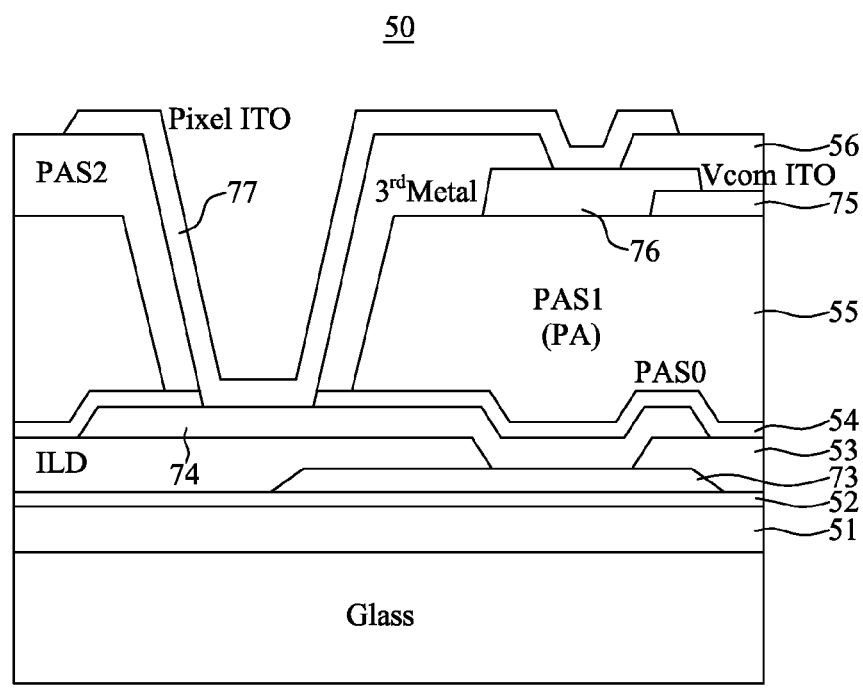
FIG. 2 is a cross section view illustrating a lower substrate in an LCD device with a built-in touch screen according to the related art.

For the contact between the common electrode and the gate metal, in case of the related art of FIG. 2, the conductive line is firstly brought into contact with the pixel electrode by the use of pixel electrode, and then the pixel electrode is secondly brought into contact with the contact electrode, to thereby make the double contact structure. Owing to the double contact structure, the aperture ratio may be lowered in the corresponding pixel with the contact structure.

However, in case of the LCD device with a built-in touch screen according to the first embodiment of the present invention, the bridge line 130 is directly brought into contact with the common electrode 170 while being overlapped with the common electrode 170 in the same vertical line, to thereby realize the high aperture ratio.

Especially, as shown in FIG. 3, the above contact structure is formed in the central portion of disclination in the multi-domain pixel structure, whereby the aperture ratio of the corresponding pixel is increased to be about 90% as compared to that of the neighboring pixels (wherein, the neighboring pixel indicates the pixel without the contact structure).

Figure 5:
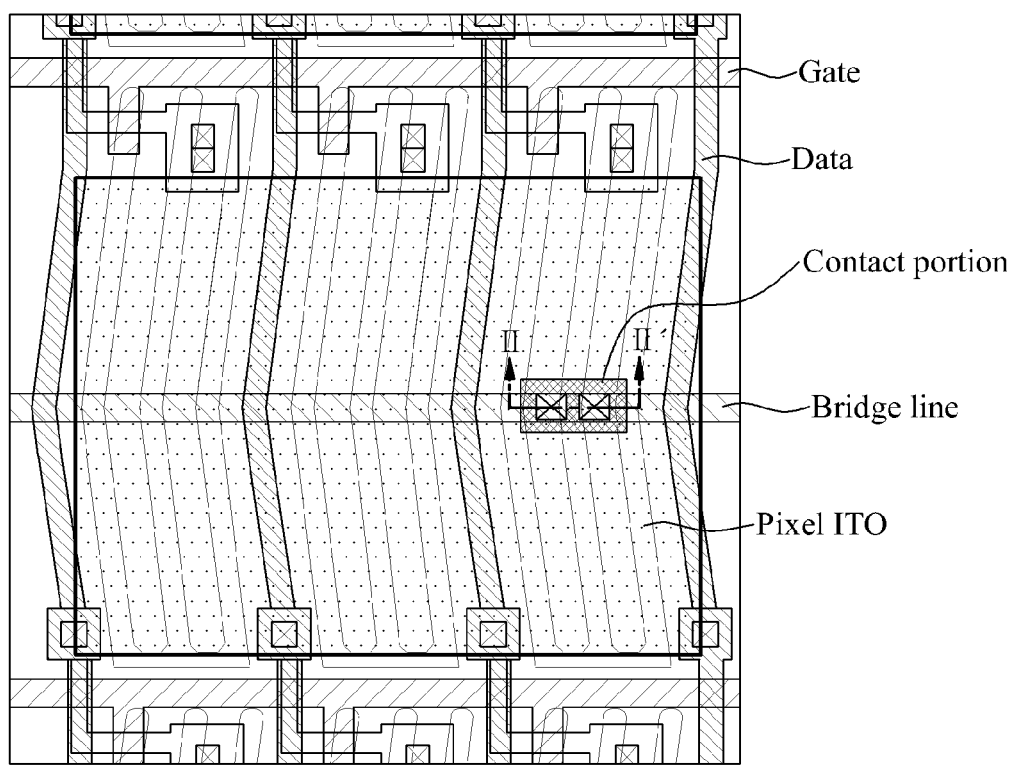
FIGS. 5 and 6 illustrate an LCD device with a built-in touch screen according to the second embodiment of the present invention.
Figure 6:
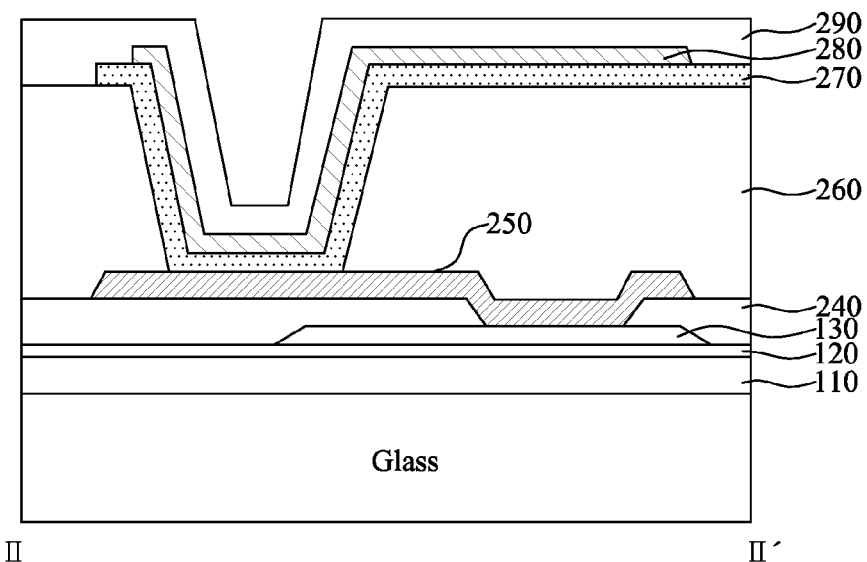

FIGS. 5 and 6 illustrate an LCD device with a built-in touch screen according to the second embodiment of the present invention. FIG. 6 is a cross section view along II-II' of FIG. 5.

FIGS. 5 and 6 show a contact portion between a bridge line and a common electrode in an entire pixel region of a lower substrate.

Except for an overlap shape of a contact structure, and an element for reducing step coverage of overlap, the LCD device according to the second embodiment of the present invention is identical in structure to the LCD device according to the first embodiment of the present invention.

Thus, wherever possible, the same reference numbers will be used throughout the drawings to refer to the same or like parts, except parts of the contact structure. Also, a detailed explanation for the same parts as those of the first embodiment will be omitted.

In the LCD device with a built-in touch screen according to the second embodiment of the present invention, a contact structure between a bridge line and a common electrode has an overlap portion, thereby increasing aperture ratio of the pixel with the contact structure, and reducing step coverage by the overlap portion of the contact structure.

Referring to FIGS. 5 and 6, on a lower substrate 200, there are a buffer layer 110; a gate insulating layer (GI) 120; a bridge line 130; an interlayer dielectric (ILD) 240; a contact metal 250; a first passivation layer (PAS1) 260; a common electrode (Vcom) 270; a conductive line (3rd metal) 280; and a second passivation layer (PAS2) 290.

The interlayer dielectric (ILD) 240 is formed to cover the bridge line 130. A predetermined portion of an upper surface of the bridge line 130 is exposed by partially etching a predetermined portion of the interlayer dielectric 240.

The contact metal 250 is overlapped with the bridge line 130 above the interlayer dielectric 240. In the exposed portion of the bridge line 130, the contact metal 250 is electrically connected with the bridge line 130. At this time, the contact portion between the bridge line 130 and the contact metal 250 is provided at one side with respect to the central portion of the bridge line 130.

At this time, the contact metal 250 may be formed of metal used for formation of source and drain electrodes of the TFT. Also, the contact metal 250 may be formed simultaneously with the source and drain electrodes of the TFT.

The bridge line 130 is overlapped with the contact metal 250.

The first passivation layer (PAS1) 260 is formed on the interlayer dielectric 240 and the contact metal 250.

A contact hole is formed by etching a predetermined portion of the first passivation layer 260. Via this contact hole, a predetermined portion of an upper surface of the contact metal 250 is exposed. In this case, the predetermined portion of the first passivation layer 260, which is not overlapped with the contact portion between the bridge line 130 and the contact metal 250, is etched.

The common electrode 270 is formed on the first passivation layer (PAS1) 260, and is also formed inside the contact hole realized by etching the first passivation layer (PAS1) 260. Inside the contact hole, the contact metal 250 is electrically connected with the common electrode 270.

The common electrodes of the neighboring pixels may be connected via the conductive line 280 by the X-axis direction or Y-axis direction. At this time, the common electrodes of the X-axis direction are brought into contact with the bridge line 130 through the aforementioned contact structure.

The conductive line 280 is formed by depositing (burying) a metal material on the first passivation layer (PAS1) 260 and inside the contact hole obtained by etching the first passivation layer (PAS1) 260. The conductive line 280 is brought into contact with the common electrode 270.

At this time, the conductive line 280 may be formed as the contact line to make the common electrode 270 driven as the touch-sensing electrode for detection of the user's touch.

The second passivation layer (PAS2) 290 is formed to cover the common electrode 270 and the conductive line 280.

In case of the LCD device according to the first embodiment of the present invention, the bridge line and the common electrode are brought into contact with each other via the contact metal, wherein the bridge line, the common electrode, and the contact metal are overlapped in the same vertical line.

In case of the LCD device according to the second embodiment of the present invention, the contact portion between the bridge line 130 and the contact metal 250, and the contact portion between the contact metal 250 and the common electrode 270 are provided at the different vertical lines.

Thus, the aperture ratio of the pixel may be increased owing to the contact between the bridge line 130 and the common electrode 270 via the contact metal 250. Also, it is possible to reduce the step coverage caused by the contact structure.

In case of the LCD device with a built-in touch screen according to the second embodiment of the present invention, as shown in FIG. 5, the contact structure is formed in the central portion of disclination in the multi-domain pixel structure, thereby realizing the high aperture ratio in the corresponding pixel.

Figure 7:
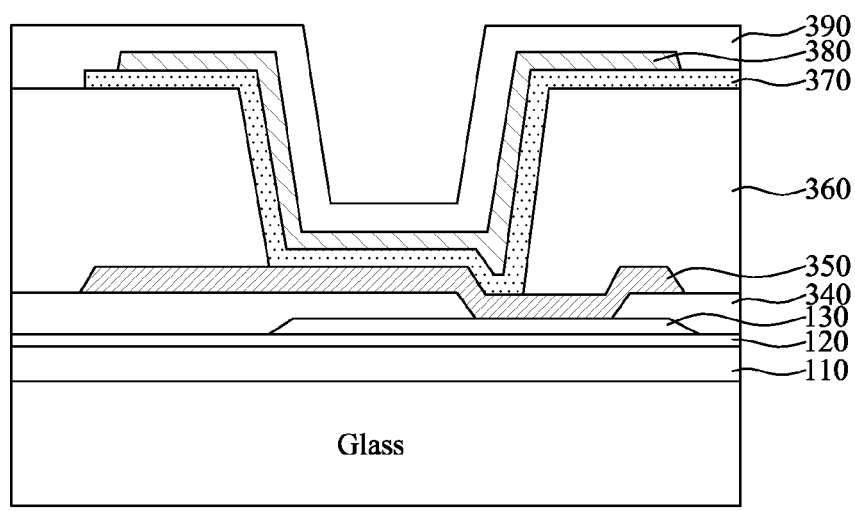
FIG. 7 illustrates an LCD device with a built-in touch screen according to the third embodiment of the present invention.

FIG. 7 illustrates an LCD device with a built-in touch screen according to the third embodiment of the present invention. FIG. 7 shows a contact portion between a bridge line and a common electrode in an entire pixel region of a lower substrate.

Except for an overlap shape of a contact structure, and an element for reducing step coverage of overlap, the LCD device according to the third embodiment of the present invention is identical in structure to the LCD device according to the first embodiment of the present invention.

Thus, wherever possible, the same reference numbers will be used throughout the drawings to refer to the same or like parts, except parts of the contact structure. Also, a detailed explanation for the same parts as those of the first embodiment will be omitted.

In the LCD device with a built-in touch screen according to the third embodiment of the present invention, a contact structure between a bridge line and a common electrode has an overlap portion, thereby increasing aperture ratio of the pixel with the contact structure, and reducing step coverage by the overlap portion of the contact structure.

Referring to FIG. 7, on a lower substrate 300, there are a buffer layer 110; a gate insulating layer (GI) 120; a bridge line 130; an interlayer dielectric (ILD) 340; a contact metal 350; a first passivation layer (PAS1) 360; a common electrode (Vcom) 370; a conductive line 380; and a second passivation layer (PAS2) 390.

The interlayer dielectric (ILD) 340 is formed to cover the bridge line 130. A predetermined portion of an upper surface of the bridge line 130 is exposed by partially etching a predetermined portion of the interlayer dielectric 340.

The contact metal 350 is overlapped with the bridge line 130 above the interlayer dielectric 340. In the exposed portion of the bridge line 130, the contact metal 350 is electrically connected with the bridge line 130. At this time, the contact portion between the bridge line 130 and the contact metal 350 is positioned at one side with respect to the central portion of the bridge line 130.

At this time, the contact metal 350 may be formed of metal used for formation of source and drain electrodes of the TFT. The bridge line 130 is overlapped with the contact metal 350.

The first passivation layer (PAST) 360 is formed on the interlayer dielectric 340 and the contact metal 350. A contact hole is formed by etching a predetermined portion of the first passivation layer 360. A predetermined portion of an upper surface of the contact metal 350 is exposed through the contact hole. At this time, the etched portion of the first passivation layer (PAS1) 360 is partially overlapped with the contact portion between the bridge line 130 and the contact metal 350.

The common electrode 370 is formed on the first passivation layer (PAS1) 360, and is formed inside the contact hole obtained by etching the first passivation layer (PAS1) 360. Inside the contact hole, the contact metal 350 is electrically connected with the common electrode 370.

The common electrodes 370 of the neighboring pixels are connected via the conductive line 370 by the X-axis direction or Y-axis direction. The common electrodes 370 of the X-axis direction are brought into contact with the bridge line 130 through the above contact structure.

The conductive line 380 is formed by depositing (burying) a metal material on the first passivation layer (PAS1) 360 and inside the contact hole obtained by etching the first passivation layer (PAS1) 360. The conductive line 380 is brought into contact with the common electrode 370.

At this time, the conductive line 380 may be formed as the contact line to make the common electrode 370 driven as the touch-sensing electrode for detection of the user's touch.

The second passivation layer (PAS2) 390 is formed to cover the common electrode 370 and the conductive line 380.

The above LCD device with a built-in touch screen according to the first embodiment of the present invention has the contact structure where the bridge line and the common electrode are overlapped with each other in the same vertical line.

Meanwhile, the LCD device with a built-in touch screen according to the third embodiment of the present invention has the contact structure where the contact portion between the bridge line 130 and the contact metal 350 is partially overlapped with the contact portion between the contact metal 350 and the common electrode 370 in the vertical line.

Thus, the aperture ratio of the pixel may be increased owing to the contact between the bridge line 130 and the common electrode 370 through the contact metal 350. Also, it is possible to reduce the step coverage caused by the contact structure.

In case of the LCD device with a built-in touch screen according to the third embodiment of the present invention, the contact structure is formed in the central portion of disclination in the multi-domain pixel structure, thereby realizing the high aperture ratio in the corresponding pixel.

The LCD devices according to the first to third embodiments of the present invention provides the good visibility of the pixel and good display quality by improving the contact structure between the bridge line and the common electrode.

Hereinafter, a method for manufacturing the LCD device with a built-in touch screen according to the embodiment of the present invention will be described with reference to FIG. 8.

Figure 8:
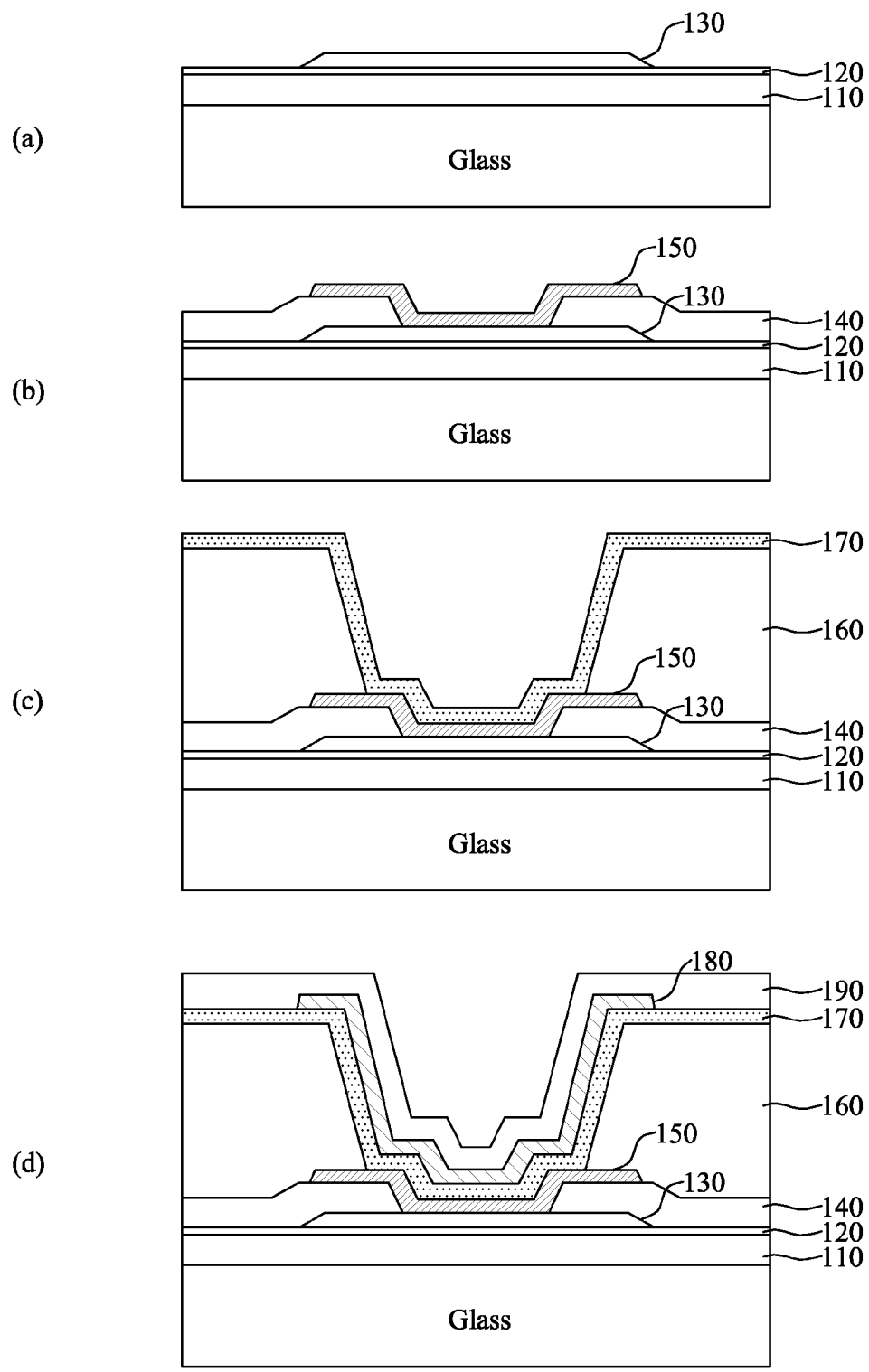
FIGS. 8A-8D illustrate a method for manufacturing an LCD device with a built-in touch screen according to the embodiment of the present invention.

FIG. 8 illustrates a method for manufacturing the LCD device according to the first embodiment of the present invention.

As shown in FIG. 8A, the buffer layer 110 is formed on the substrate. Then, TEOS (Tetra Ethyl Ortho Silicate) or MTO (Middle Temperature Oxide) may be deposited on an entire surface of the substrate, to thereby form the gate insulating layer 120.

Thereafter, a metal material is deposited on the gate insulating layer 120, and then photolithography and dry-etching process using a mask is applied to the deposited metal material, to thereby form the bridge line 130.

The substrate may be formed of glass or plastic material. FIGS. 8A-8D show the exemplary case using the glass substrate.

As shown in FIG. 8B, an insulating material is deposited on the substrate to cover the bridge line 130 and the gate insulating layer 120, thereby forming the interlayer dielectric (ILD) 140.

Then, photolithography and dry-etching process using a mask is carried out to etch a predetermined portion of the interlayer dielectric 140, thereby forming the first contact hole for exposing the upper surface of the central portion of the bridge line 130.

Then, a metal material is deposited to cover the interlayer dielectric 140, and photolithography and wet-etching process using a mask is applied to the deposited metal material, to thereby form the contact metal 150.

The contact metal 150 is formed by the process for forming the source and drain electrodes of the TFT, and is simultaneously with the source and drain electrodes of the TFT. The bridge line 130 and the contact metal 150 are electrically connected with each other inside the first contact hole obtained by etching the interlayer dielectric 140.

As shown in FIG. 8C, the first passivation layer (PAS1) 160 is formed to cover the interlayer dielectric 140 and the contact metal 150, and then photolithography and etching process is applied thereto, to thereby form the second contact hole.

The second contact hole is formed in the contact portion between the bridge line 130 and the contact metal 150.

After that, a transparent conductive material such as ITO is deposited on the first passivation layer (PAS1) 160, and is formed inside the second contact hole, to thereby form the common electrode (Vcom) 170. Thus, the bridge line 130 and the common electrode 170 are electrically connected with each other via the contact metal 150 inside the second contact hole.

As shown in FIG. 8D, a conductive metal material is deposited on the common electrode 170, and photolithography and etching process using a mask is applied to the deposited conductive metal material, to thereby form the conductive line 180 electrically connected with the common electrode 170.

The second passivation layer (PAS2) 190 is formed to cover the common electrode 170 and the conductive line 180.

In the method for manufacturing the LCD device with a built-in touch screen according to the embodiment of the present invention, the bridge line and the common electrode are overlapped in the same vertical line, to thereby realize the high aperture ratio in the pixel with the contact structure.

Also, the passivation layer PAS0, which has been applied to the related art structure, is omitted so that the contact structure and the manufacturing process are simplified, thereby improving the manufacturing efficiency and price competition of the LCD device with a built-in touch screen according to the present invention.

Although not shown, the method for manufacturing the LCD device with a built-in touch screen according to another embodiment of the present invention, the first contact hole and the second contact hole, which are formed by the processes of FIG. 8B and FIG. 8C, are not overlapped with each other, to thereby form the contact structure according to the second embodiment of the present invention, as shown in FIG. 6.

The contact structure according to the third embodiment of the present invention may be obtained by partially overlapping the first and second contact holes, as shown in FIG. 7.

The LCD device according to an embodiment of the present invention has the contact structure where the touch-sensing electrode (common electrode) is brought into contact with the bridge line, to thereby improve the display quality owing to the high aperture ratio of the pixel.

In case of the LCD device according to the second embodiment of the present invention, the contact structure between the common electrode and the bridge line is formed in the central portion of disclination in the multi-domain pixel structure, thereby realizing the high aperture ratio in the corresponding pixel.

Also, the simplified manufacturing process of the lower substrate in the LCD device according to the present invention enables to reduce the manufacturing cost of the LCD device, and to improve the manufacturing efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device with a built-in touch screen, which uses a common electrode as a touch-sensing electrode, the device comprising:
   an intersection of a gate line and a data line to define a multi-domain pixel region;
   a bridge line disposed in a central portion of the pixel to block disclination of the multi-domain pixel region, the bridge line being parallel with the gate line;
   an insulating layer formed on the bridge line, a first contact hole being disposed through the insulating layer to expose a predetermined portion of an upper surface of the bridge line;
   a contact metal on the insulating layer and inside the first contact hole, the contact metal being electrically connected with the bridge line;
   a first passivation layer on the contact metal, a second contact hole being disposed through the first passivation layer to expose a predetermined portion of an upper surface of the contact metal;

a common electrode on the first passivation layer and inside the second contact hole;

a conductive line electrically connected with the common electrode; and a second passivation layer on the first passivation layer and the conductive line, wherein the bridge line and the common electrode are electrically connected via the contact metal.

2. The liquid crystal display device according to claim 1, wherein a first contact portion between the bridge line and the contact metal is at least partially overlapped with a second contact portion between the contact metal and the common electrode.

3. The liquid crystal display device according to claim 2, wherein the first and second contact portions are overlapped with the bridge line.

4. The liquid crystal display device according to claim 2, wherein the first contact portion is overlapped with one side of the gate metal, and the second contact portion is overlapped with the other side of the gate metal.

5. The liquid crystal display device according to claim 1, wherein the first contact portion between the gate metal and the contact metal is not overlapped with the second contact portion between the contact metal and the common electrode.

6. The liquid crystal display device according to claim 2, wherein an aperture ratio in the pixels with the first contact portion and the second contact portion is about 90% or more as compared to that of the neighboring pixels.

7. The liquid crystal display device according to claim 1, wherein the common electrodes of neighboring pixels in the left and right directions are connected through the bridge line.

8. The liquid crystal display device according to claim 1, wherein the bridge line and the gate line are simultaneously formed on the same layer.

9. The liquid crystal display device according to claim 1, wherein the first contact hole is formed by etching a predetermined portion of the insulating layer corresponding to the bridge line.

10. The liquid crystal display device according to claim 1, wherein the second contact hole is formed by obtained by etching a predetermined portion of the first passivation layer corresponding to the contact metal.

* * * * *